Feb. 9, 1960 W. F. SCHREIBER 2,924,816

ELECTRONIC COUNTER

Filed Sept. 14, 1956 2 Sheets-Sheet 1

WILLIAM F. SCHREIBER
INVENTOR.

BY Lyon & Lyon

ATTORNEYS

Feb. 9, 1960 W. F. SCHREIBER 2,924,816

ELECTRONIC COUNTER

Filed Sept. 14, 1956 2 Sheets-Sheet 2

WILLIAM F. SCHREIBER
INVENTOR.

BY Lyon & Lyon
ATTORNEYS

United States Patent Office 2,924,816

Patented Feb. 9, 1960

2,924,816

ELECTRONIC COUNTER

William F. Schreiber, North Hollywood, Calif., assignor to Technicolor Corporation, Hollywood, Calif., a corporation of Maine Application September 14, 1956, Serial No. 609,849

8 Claims. (Cl. 340—347)

This invention relates to electronic counters and, more particularly, to code-converting counters.

For reasons of economy, as well as for ease in error detection, present-day information-handling machines are preferably constructed to use the binary system of mathematics, in place of the decimal system. The arrangement of ones and zeros, which is known as the most natural arrangement, is called the standard binary code. This natural arrangement is well known and in it each digit position represents a power of two which is present in the value of the number being expressed when a one is in that digit position and which is absent when a zero is in that digit position. Thus, the binary number 1000 is $2^3$, or eight, the binary number 1001 is $2^3+2^0$, or nine.

Another arrangement of ones and zeros which possesses many advantages over the standard system is called the reflected binary code. For example, in a patent to Carbrey, No. 2,571,680, the reflected binary code is described and there is shown an arrangement for converting from reflected binary code to the standard binary code. A common method of translating from the decimal system into the binary system is to count by means of a binary counter a number of pulses equal to the number in the decimal system. Using the two possible states of each counter stage to signify a one or a zero, depending upon its conduction condition, then the outputs of the successive stages of the binary counter give the standard binary system representation of the original decimal number. If, instead of the natural binary system, it is desired to have the output of the counter represent the reflected binary code, then the translation from standard binary to reflected binary is normally accomplished by means of relatively complicated and bulky code-converting systems.

An object of the present invention is to provide a pulse counter, the output of which represents the count of the counter in the reflected binary code.

Another object of the present invention is the provision of a simple apparatus for counting input pulses and providing as its output an electrical representation in the reflected binary code of the count.

Yet another object of the present invention is to provide a novel and useful counter.

These and other objects of the invention are achieved by providing a counter having a bistable state circuit for each digit position desired to be represented in the reflected binary code. Each of these bistable state circuits is driven from one stable state to the other by successive input pulses, one stable state providing an output representative of a one digit and the other stable state providing an output representative of a zero digit. The last and the next-to-the-last bistable state circuits are respectively coupled to be driven by the zero and one outputs of the third-from-the-last bistable state circuit of the counter. The means employed for coupling in each case is a delay circuit. Each of the remaining bistable state circuits of the counter is coupled to the immediately succeeding bistable state circuit of the counter, to be driven therefrom by a different one of a plurality of delay circuits, the delay of each succeding delay circuit in the counter sequence being twice the delay of the preceding delay circuit. Thus, if a five-stage counter is desired, having the capacity to count to 32, the delay of the first delay circuit connecting the first flip-flop to the second flip-flop may be considered as having unity delay time, the succeeding delay circuit has twice unity, and the delay circuits coupling the third flip-flop to the fourth and fifth flip-flops each have a delay of four times unity.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

In the table below there is shown a reflected binary code count from zero to 31. Observation of the table will reveal that the change between successive counts in the reflected code is manifested by a change in only one digit. This increases reliability in apparatus which detects changing counts, since, where only a single digit position changes, there is less opportunity for error than where more than a single digit position changes simultaneously in the progression of the count. It should be further noted that changes between ones and zeros in the first digit position of the code alternate every two counts; changes in the second digit position between ones and zeros alternate every four counts; in the third digit position alternate between ones and zeros every eight counts; etc. Thus it is required in the counter for the reflected code that the stages of the counter corresponding to the digit positions change from the zero to the one condition in the same manner.

| | 1 | 2 | 3 | 4 | 5 |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 0 | 1 | 0 | 0 | 0 |
| 4 | 0 | 1 | 1 | 0 | 0 |
| 5 | 1 | 1 | 1 | 0 | 0 |
| 6 | 1 | 0 | 1 | 0 | 0 |
| 7 | 0 | 0 | 1 | 0 | 0 |
| 8 | 0 | 0 | 1 | 1 | 0 |
| 9 | 1 | 0 | 1 | 1 | 0 |
| 10 | 1 | 1 | 1 | 1 | 0 |
| 11 | 0 | 1 | 1 | 1 | 0 |
| 12 | 0 | 1 | 0 | 1 | 0 |
| 13 | 1 | 1 | 0 | 1 | 0 |
| 14 | 1 | 0 | 0 | 1 | 0 |
| 15 | 0 | 0 | 0 | 1 | 0 |
| 16 | 0 | 0 | 0 | 0 | 1 |
| 17 | 1 | 0 | 0 | 0 | 1 |
| 18 | 1 | 1 | 0 | 0 | 1 |
| 19 | 0 | 1 | 0 | 0 | 1 |
| 20 | 0 | 1 | 1 | 0 | 1 |
| 21 | 1 | 1 | 1 | 0 | 1 |
| 22 | 1 | 0 | 1 | 0 | 1 |
| 23 | 0 | 0 | 1 | 0 | 1 |
| 24 | 0 | 0 | 1 | 1 | 1 |
| 25 | 1 | 0 | 1 | 1 | 1 |
| 26 | 1 | 1 | 1 | 1 | 1 |
| 27 | 0 | 1 | 1 | 1 | 1 |
| 28 | 0 | 1 | 0 | 1 | 1 |
| 29 | 1 | 1 | 0 | 1 | 1 |
| 30 | 1 | 0 | 0 | 1 | 1 |
| 31 | 0 | 0 | 0 | 1 | 1 |

Figure 1:
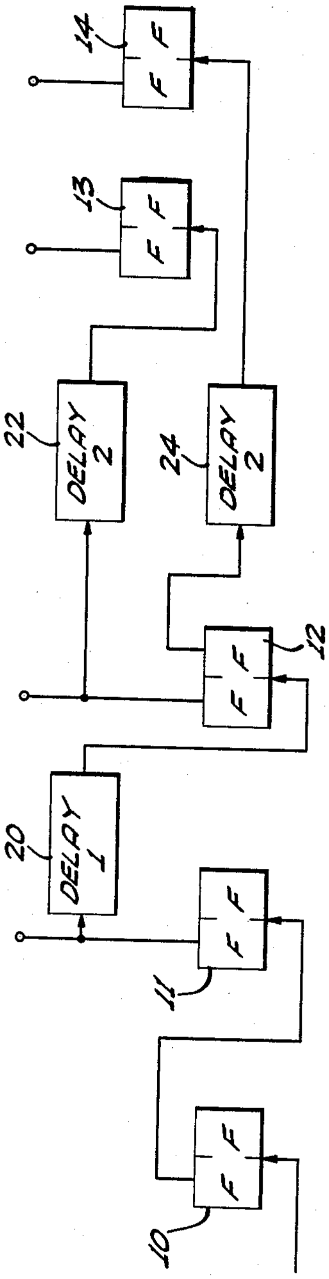
Figure 1 is a block diagram of a four-stage counter in accordance with this invention.

Reference is now made to Figure 1, which shows a block diagram of a four-stage counter in accordance with this invention. The counter includes four digit-position-representative flip-flops 11, 12, 13, and 14. An input flip-flop 10 is employed for reducing the pulse frequency which is to be counted by the remainder of the counter by a factor of two. The flip-flop circuits employed herein are of the well-known type of Eccles-Jordan trigger circuit, which is described and shown, for example, in the book Electronics, by Elmore and Sands, published by the McGraw-Hill Book Company in 1949, on pp. 96 et seq. These flip-flop circuits are bistable state devices having an output for each of the stable states. One of these outputs may be designated as a one output and the other output as the zero output. These flip-flops may be driven from one to the other of these stable states by succeeding input pulses.

Let it first be assumed that it is desired to count pulses being provided at a regular frequency. The pulses from the source are applied to the flip-flop 10. The flip-flop 10 will apply an output in response to every two input pulses to the succeeding flip-flop 11. The first pulse received by flip-flop 11 drives it to its one state. An output is applied to a delay circuit 20. This circuit is given a delay time of one baud. A baud is defined as the interval between the original full-rate input pulses. Therefore, at the time the flip-flop 10 receives the second input pulse, the flip-flop 12 is driven to the stable condition whereby its one output is enabled in response to the output from the delay 20. Referring to the table previously shown, it will be seen that the counter, in response to two input pulses, has manifested the counts of one and two in reflected binary code. The output of the flip-flop 12 is applied to the two succeeding flip-flops 13 and 14. From the one output of flip-flop 12, a second delay circuit 22, having a delay time of two bauds, drives the flip-flop 13. When the zero output of flip-flop 12 is enabled, a third delay circuit 24, also having a delay time of two bauds, drives the flip-flop 14. Thus, when the one output of the flip-flop 12 is enabled, two pulse intervals thereafter the flip-flop 13 is driven. When the zero output of flip-flop 12 is enabled, it applies a pulse to delay 24 and flip-flop 14 is driven two bauds thereafter.

When the third input pulse is applied to the counter, the output of flip-flop 10 drives flip-flop 11 to its zero stable condition. At the time the fourth pulse is applied to flip-flop 10, flip-flop 13 is driven from the delay circuit 22. Upon the receipt of the fifth pulse by flip-flop 10, an output is provided which drives the flip-flop 11. Thus, referring to the table previously shown, flip-flops 11, 12, and 13 are in the condition with their one outputs high. When the sixth pulse is applied to the input flip-flop 10, flip-flop 12 is again driven by the delay circuit 20. This time, however, it is turned over to its zero stable state. Upon receiving a seventh input pulse, flip-flop 10 restores flip-flop 11 to its zero stable condition. Upon receiving the eighth input pulse, flip-flop 14 is driven in response to the output of the second delay circuit 24. Thus, the conditions of the four flip-flop circuits in the counter are such that their outputs represent the number eight in reflected binary code.

Figure 2:
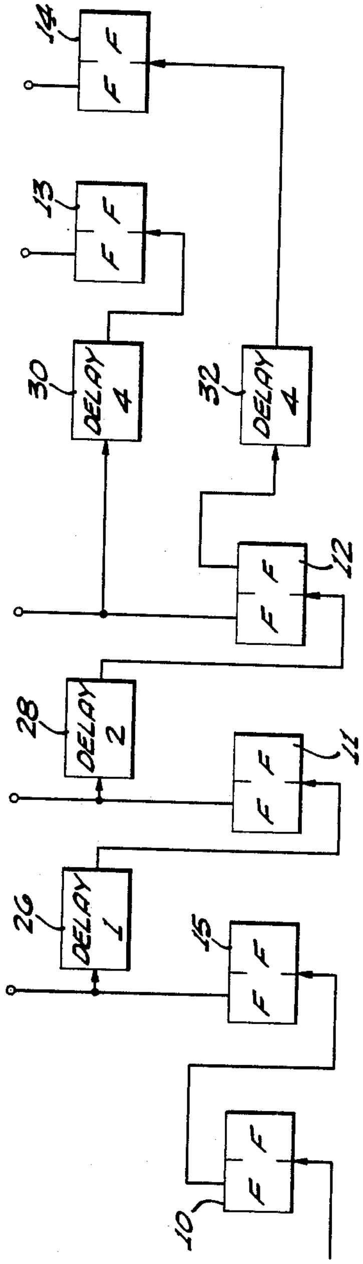
Figure 2 illustrates an extension of the principles of the invention to a five-stage counter.

From the above description, the operation of the counter in counting up to 15 should be apparent. In order to extend the counter for the purpose of counting more than 15, additional stages may be added in the manner to be described. To extend the counter, consider the arrangement shown in Figure 1, exclusive of the flip-flop 10, as representing the last four stages of the counter. Any further extensions of the counter may be inserted in front of the last four stages. By way of illustration, Figure 2 represents the reflected binary counter which can count to 31. The flip-flops of the last four stages have been labeled with the same reference numerals as the last four stages in Figure 1. It will be seen that their interconnection and operation is identical with that previously described. A fifth flip-flop stage 15 is inserted in front of the flip-flop stage 11 and is coupled thereto by a delay circuit 26. This delay circuit receives an output pulse when the flip-flop 15 is driven to that stable condition when its one output is made high. The delay time of the delay circuit 26 is one baud. The delay time of the delay circuit 28, which couples flip-flop 11 to flip-flop 12, is made two bauds. The delay time of the delay circuits 30 and 32, which respectively couple the one and zero output of the flip-flop 12 to the flip-flops 13 and 14, are made four bauds. It can thus be seen that the delay time of the succeeding delay circuits in the order of the counter is twice that of the preceding delay circuits.

If it was desired to count 64, another flip-flop circuit would be inserted in front of the flip-flop 15 and would drive the flip-flop 15 through a delay circuit. The delay time of the first delay circuit would, in that instance, be double the delay time shown. The input flip-flop 10 again serves the function of applying every-other pulse to the remaining flip-flop circuits.

From the description give in Figure 1, the operation of the counter shown in Figure 2 should be apparent. Flip-flop 15 is driven between its one and zero stable conditions for every two input pulses applied to flip-flop 10. Flip-flop 11 is driven from its zero to its one stable condition at the time of the application of the second pulse to the flip-flop 10, and is then driven from its one to its zero stable condition at the time of the application of the sixth input pulse of flip-flop 10. Thereafter, it is driven from its zero to its one stable state and back for every four input pulses to flip-flop 10. Flip-flop 12 is driven to its one stable condition upon the application of the fourth input pulse to flip-flop 10. It remains in the one stable condition until the application of the twelfth input pulse to flip-flop 10. Thereafter, it goes from zero to one and for every eight input pulses. Flip-flop 13 and flip-flop 14 respond in response to the application of input pulses in the manner set forth in the table shown above.

As thus far described, the operation of the counter is what may be termed a synchronous one, that is, the input thereto consists of pulses which occur periodically. These embodiments of the invention, however, may be converted without difficulty to asynchronous operation. An illustration of an asynchronous operating counter which has as its output the reflected binary code representative of the count therein is shown in the block diagram of Figure 3. The delay circuits which may be termed passive delay circuits, shown in Figures 1 and 2, are replaced by what may be termed an active delay circuit. These active delay circuits serve the function of delaying the presentation of an output pulse until they have received two input pulses at two separate input points, in prearranged sequence.

An illustration of an active delay circuit is again a flip-flop circuit; this time, however, instead of the input pulses being simultaneously applied to both tubes in the flip-flop circuit, to insure that conduction is transferred from one to the other in response to the successive input pulses, input is applied to the two tubes of the flip-flop circuit in a manner so that in order to successively trip the flip-flop circuit from one to the other of its stable conditions, the input pulses must occur in sequence. This is another well-known arrangement for a flip-flop circuit and is shown, for example, in the aforesaid book Electronics, on page 107.

Figure 3:
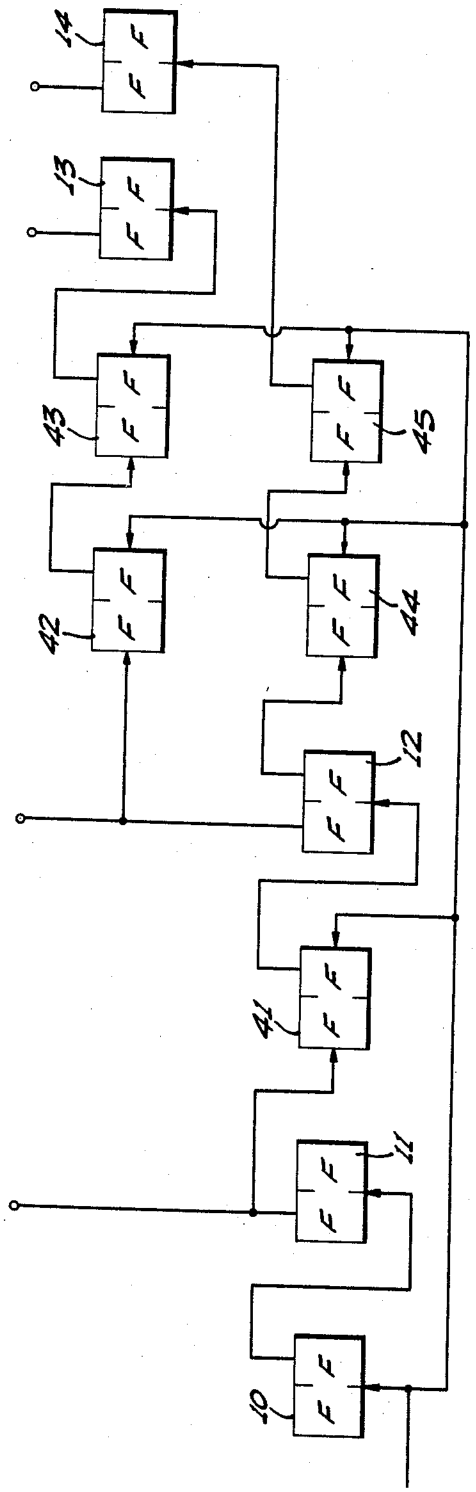
Figure 3 is a block diagram of an embodiment of the invention which may be employed for counting as asynchronous pulse input.

Referring now to Figure 3, the first active delay element 41, which replaces the passive delay element 20 in Figure 1, consists of a flip-flop which is driven from the first to its second stable condition in response to the one output from the counter flip-flop 11. Flip-flop 41 is reset to its initial stable condition by the next pulse to be counted after it has been set in its initial stable condition by the output from flip-flop 11. The passive delay circuits 22 and 24 are replaced by, respectively, flip-flops 42 and 43, 44 and 45.

The necessity for two delay flip-flops in place of the passive delay circuits 22, 24 in Figure 2 should be appreciated from the fact that for flip-flop 12 to drive flip-flops 13 or 14 twice the number of pulses are required to be applied to the counter than are required when flip-flop 11 drives flip-flop 12. Expressing this in terms of delay is not precisely accurate, since this counter is a random pulse counter. However, in terms of pulses required for propagating a count from flip-flop 12 to flip-flop 13 and from flip-flop 12 to flip-flop 14, twice as many are required as are necessary to propagate a count from flip-flop 11 to flip-flop 12. A description of the operation of the counter is substantially the same as the description for operating the counter shown in Figure 1, except that in view of the active delay elements the input pulses to the counter are used as the second required pulses to trip the delay elements to provide an output.

Accordingly, there has been shown and described above a novel, simple, and useful arrangement for counting pulses, either from a periodic or an aperiodic source, wherein a counter which is the embodiment of this invention provides an output which is representative of the count in the counter in reflected binary code.

I claim:

1. A pulse counter providing an output voltage pattern representative of its count in reflected binary code comprising a bistable state circuit for each digit position in said code, each being driven from one stable state to the other by successive pulses, one stable state providing an output representative of a one digit and the other stable state providing an output representative of a zero digit, a pair of delay circuits, the last and next-to-the-last bistable state circuits of said counter being respectively coupled to the zero and one outputs of the third-from-the-last bistable state circuit of said counter by a different one of said pair of delay circuits, and a plurality of delay circuits, each of the remaining bistable state circuits of said counter being coupled to the immediately succeeding bistable state circuit in said counter by a different one of said plurality of delay circuits, the delay of each succeeding delay circuit in the sequence of said counter being twice the delay of the preceding delay circuit.

2. A pulse counter providing an output voltage pattern representative of its count in reflected binary code comprising a flip-flop circuit for each digit position in said code, each flip-flop circuit having two stable states and being driven from one to the other by successive pulses, one stable state providing an output representing a "one" digit and the other stable state providing an output representative of a "zero" digit, a first delay circuit coupled between one output of a first of said flip-flops and the input of a second of said flip-flops, a second and a third delay circuit, said second and third delay circuits providing twice the delay of said first delay circuit, said second delay circuit coupling the one output of the second of said flip-flops to the input to a third of said flip-flops, said third delay circuit coupling the zero output of the second of said flip-flops to the input of a fourth of said flip-flops, and means to apply pulses to the input to the first of said flip-flops.

3. A pulse counter as recited in claim 2 wherein said delay circuits are delay lines and the interval of delay of said first delay circuit equals the interval between successive pulses at the desired counting frequency.

4. A pulse counter as recited in claim 3 wherein said means to apply pulses to the first of said flip-flops includes a flip-flop circuit having one of its outputs coupled to the input to the first of said flip-flops.

5. A pulse counter as recited in claim 2 wherein said first, second, third and fourth of said flip-flops are the last four stages of said counter, and there is provided for each of the preceding stages of said counter a delay circuit for coupling the output of a preceding flip-flop to the input of the succeeding flip-flop, the delay time of each delay circuit being twice that of the immediate preceding delay circuit.

6. A pulse counter as recited in claim 2 wherein said first delay circuit includes a delay flip-flop circuit of the type having two stable states having an output for each of said stable states, having two separate inputs, and being driven from one to the other of said stable states by the successive application of pulses from one to the other of said two separate inputs, said second and third delay lines each includes two of said delay flip-flops, and means coupling a first of said two delay flip-flops to drive the second from one of the outputs of the first.

7. A pulse counter as provided in claim 5 wherein the first of the delay circuits at the input end of said counter includes a delay flip-flop, the remaining ones of said delay circuits including as many delay flip-flops as their delay time is a multiple of the delay time of said first of said delay circuits.

8. A pulse counter providing an output voltage pattern representative of its count in reflected binary code comprising a flip-flop circuit for each digit position in said code, each flip-flop circuit having two stable states and being driven from one to the other by successive pulses, one stable state providing an output representing a "one" digit and the other stable state providing an output representative of a "zero" digit, a first delay circuit coupled between one output of a first of said flip-flops and the input of a second of said flip-flops, said first delay circuit including means to provide an output responsive to a sequence of two inputs, the first of said two inputs being provided by said one output of said first flip-flop, a second and a third delay circuit, said second and third delay circuits providing twice the delay of said first delay circuit, said second delay circuit coupling the "one" output of the second of said flip-flops to the input to a third of said flip-flops, said third delay circuit coupling the zero output of the second of said flipflops to the input of a fourth of said flip-flops, each of said second and third delay circuits including two of said means to provide an output responsive to a sequence of two inputs, the first of said two means receiving the first of said two inputs from said third flip-flop, the second of said two means receiving the first of said two inputs from the output of the first of said two means, and means to apply pulses to be counted to said counter and to all said means to provide an output as a second input in the sequence of two inputs.

References Cited in the file of this patent

UNITED STATES PATENTS

| | | |
|---|---|---|
| 2,571,680 | Carbrey | Oct. 16, 1951 |
| 2,774,868 | Havens | Dec. 18, 1956 |
| 2,814,441 | Chaimowicz | Nov. 26, 1957 |
| 2,823,856 | Booth et al. | Feb. 18, 1958 |